(12) United States Patent
Valentin

(10) Patent No.: US 12,539,119 B2
(45) Date of Patent: Feb. 3, 2026

(54) SURGICAL DEVICE CONFIGURED TO DELIVER MULTIPLE IMPLANTS OR TOOLS

(71) Applicant: Arthrex, Inc., Naples, FL (US)

(72) Inventor: Jason Valentin, Fort Meyers, FL (US)

(73) Assignee: Arthrex, Inc., Naples, FL (US)

( * ) Notice: Subject to any disclaimer, the term of this patent is extended or adjusted under 35 U.S.C. 154(b) by 360 days.

(21) Appl. No.: 18/195,629

(22) Filed: May 10, 2023

(65) Prior Publication Data
US 2024/0374255 A1 Nov. 14, 2024

(51) Int. Cl.
*A61B 17/072* (2006.01)
*A61B 17/00* (2006.01)

(52) U.S. Cl.
CPC ............... *A61B 17/07207* (2013.01); *A61B 2017/00831* (2013.01)

(58) Field of Classification Search
None
See application file for complete search history.

(56) References Cited

U.S. PATENT DOCUMENTS

| | | | |
|---|---|---|---|
| 5,782,862 A * | 7/1998 | Bonutti | A61B 17/0401 606/232 |
| 5,989,252 A | 11/1999 | Fumex | |
| 8,961,538 B2 | 2/2015 | Koogle, Jr. et al. | |
| 9,504,460 B2 | 11/2016 | Stone et al. | |
| 9,561,025 B2 | 2/2017 | Stone et al. | |
| 9,622,736 B2 | 4/2017 | Stone et al. | |
| 10,548,590 B2 | 2/2020 | Harris et al. | |
| 10,568,616 B2 * | 2/2020 | Monllor | A61B 17/0401 |
| 10,932,770 B2 | 3/2021 | Stone et al. | |
| 11,013,509 B2 | 5/2021 | Williams et al. | |
| 11,419,600 B2 | 8/2022 | Binmoeller et al. | |
| 11,446,023 B2 | 9/2022 | Binmoeller et al. | |

(Continued)

FOREIGN PATENT DOCUMENTS

EP 0599772 A1 6/1994

OTHER PUBLICATIONS

Fiberstitch™ all-inside meniscal repair technique. Arthrex. (n.d.). Retrieved Apr. 10, 2023, from https://www.arthrex.com/knee/fiberstitch-allinside-meniscal-repair-technique.

(Continued)

*Primary Examiner* — Shaun L David
(74) *Attorney, Agent, or Firm* — Carlson, Gaskey & Olds, P.C.

(57) ABSTRACT

This disclosure details a surgical device configured to deliver multiple implants or tools, including corresponding techniques, assemblies, systems, and methods, for using the surgical device. A surgical device according to an exemplary aspect of the present disclosure includes, among other things, a main handle, a main shaft, an inserter partially within the main shaft, and an implant adjacent a distal end of the inserter. The surgical device is configured such that the implant is moveable from a retracted position within the main shaft to an intermediate position within the main shaft by distal movement of the inserter relative to the main handle. Further, the surgical device is configured such that the implant is moveable from the intermediate position to a deployed position distal of the main shaft by relative movement of the main shaft and the main handle.

20 Claims, 9 Drawing Sheets

(56) References Cited

U.S. PATENT DOCUMENTS

| | | | |
|---|---|---|---|
| 11,612,391 B2 | 3/2023 | Stone et al. | |
| 2001/0002440 A1* | 5/2001 | Bonutti | A61B 17/0401 |
| | | | 606/232 |
| 2004/0073219 A1* | 4/2004 | Skiba | A61F 2/0811 |
| | | | 606/916 |
| 2008/0033460 A1* | 2/2008 | Ziniti | A61B 17/0401 |
| | | | 606/148 |
| 2008/0109037 A1* | 5/2008 | Steiner | A61B 17/0401 |
| | | | 606/232 |
| 2010/0198258 A1* | 8/2010 | Heaven | A61B 17/0401 |
| | | | 606/232 |
| 2012/0109156 A1* | 5/2012 | Overes | A61B 17/0483 |
| | | | 606/139 |
| 2012/0116450 A1* | 5/2012 | McDevitt | A61B 17/0401 |
| | | | 606/232 |
| 2012/0215257 A1* | 8/2012 | McDevitt | A61B 17/0401 |
| | | | 606/228 |
| 2016/0113757 A1* | 4/2016 | Diduch | A61B 17/8894 |
| | | | 606/104 |
| 2018/0221013 A1* | 8/2018 | Marks | A61B 17/1796 |
| 2019/0015091 A1 | 1/2019 | Guo et al. | |
| 2020/0383679 A1 | 12/2020 | Alfia et al. | |
| 2021/0259677 A1 | 8/2021 | Williams et al. | |
| 2021/0361286 A1 | 11/2021 | Stone et al. | |
| 2022/0175368 A1* | 6/2022 | Marks | A61B 17/0482 |
| 2022/0240919 A1 | 8/2022 | Hernandez et al. | |
| 2022/0387014 A1 | 12/2022 | Williams et al. | |

OTHER PUBLICATIONS

SoftStitch™ Meniscal Repair System Surgical Technique. Arthrex.

* cited by examiner

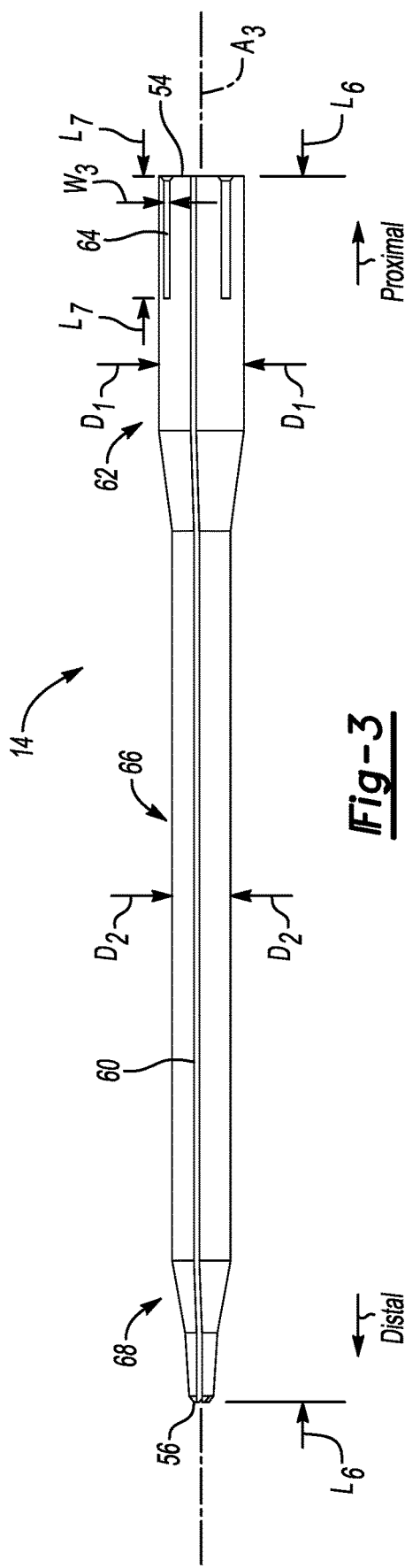
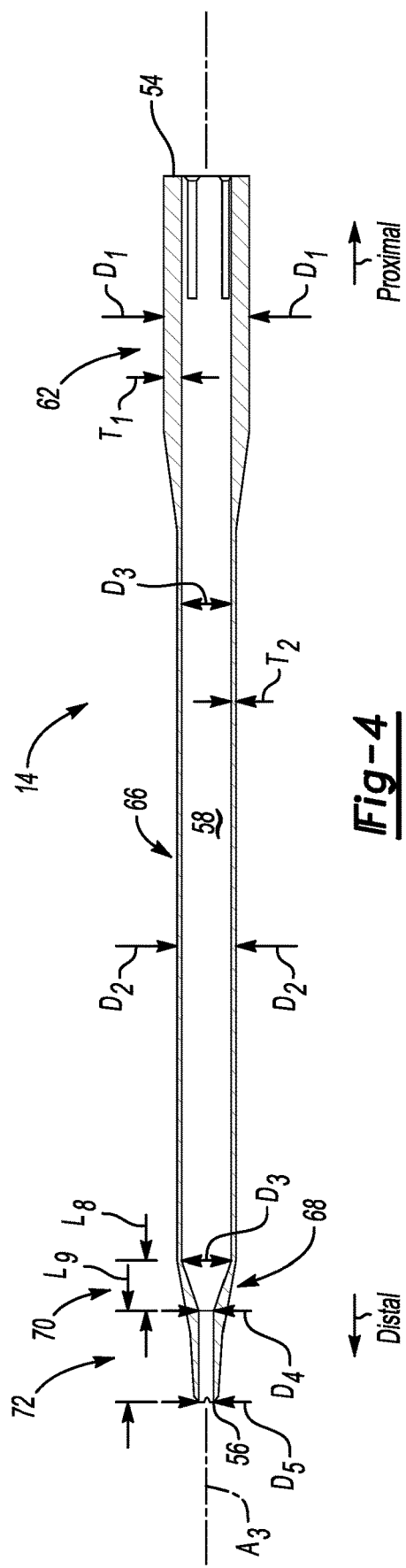
Fig-3
Fig-4

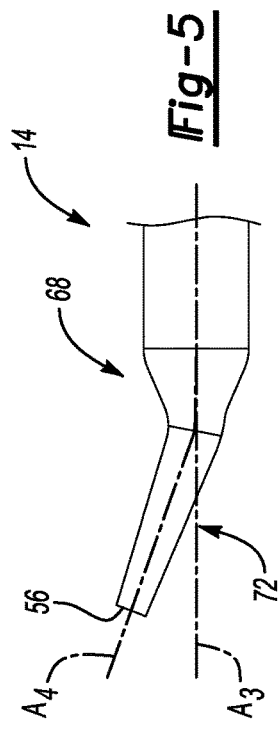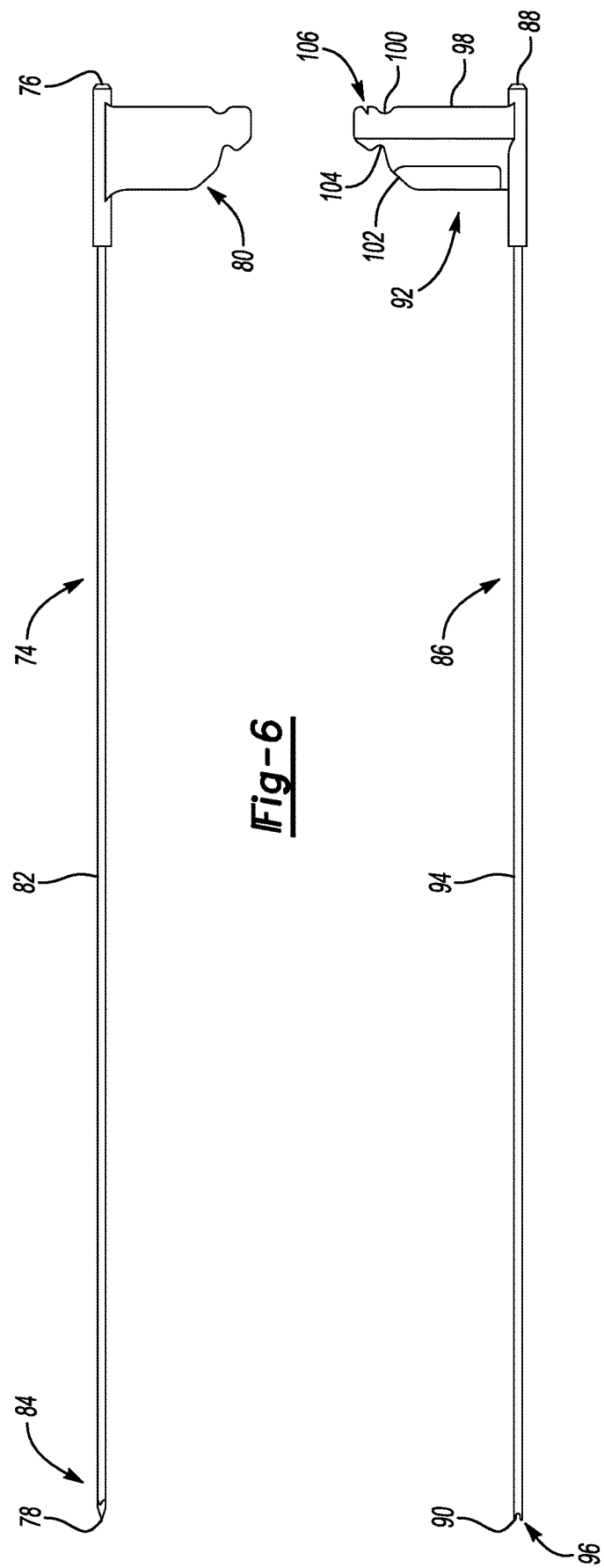

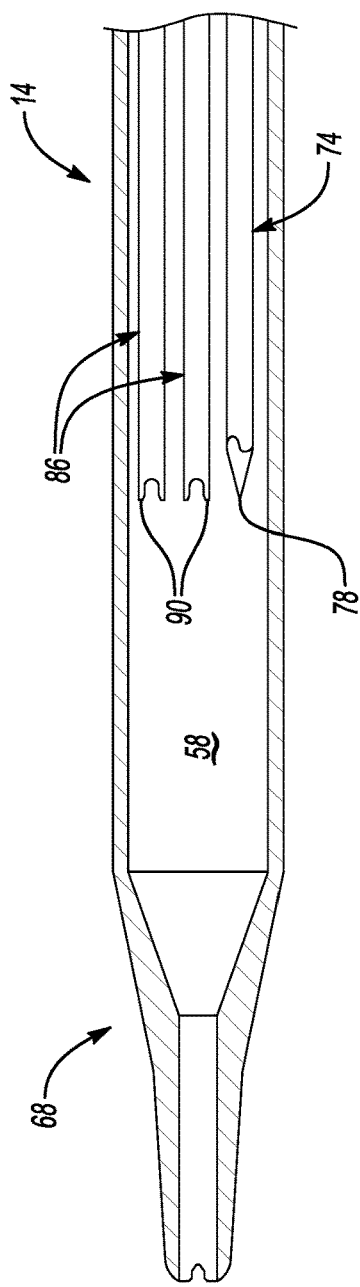
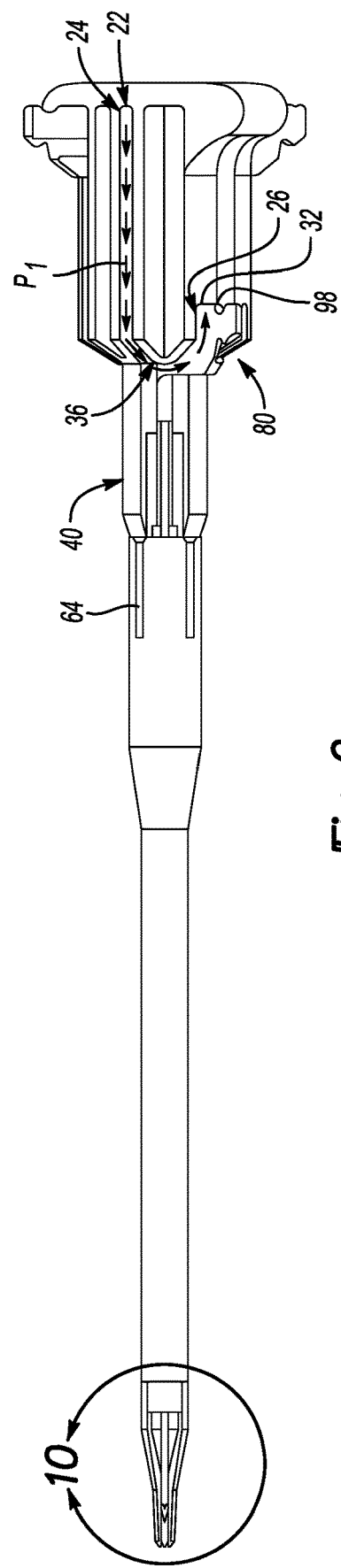

SURGICAL DEVICE CONFIGURED TO DELIVER MULTIPLE IMPLANTS OR TOOLS

BACKGROUND

When soft tissue such as a ligament or a tendon becomes detached from a bone, surgery is usually required to reattach or reconstruct the tissue. Often, a tissue graft is attached to the bone to facilitate regrowth and permanent attachment. Techniques and devices that have been developed generally involve using suture anchors to fix soft tissue to bone.

SUMMARY

This disclosure details a surgical device configured to deliver multiple implants or tools, including corresponding techniques, assemblies, systems, and methods, for using the surgical device.

Among other benefits, the disclosed surgical device permits a user to deploy multiple implants or tools using a single surgical device, thereby reducing, or eliminating, the need to change surgical devices throughout a procedure. Further, the disclosed surgical device is configured to control the depth of insertion of the delivered implants or tools.

A surgical device according to an exemplary aspect of the present disclosure includes, among other things, a main handle, a main shaft, an inserter partially within the main shaft, and an implant adjacent a distal end of the inserter. The surgical device is configured such that the implant is moveable from a retracted position within the main shaft to an intermediate position within the main shaft by distal movement of the inserter relative to the main handle. Further, the surgical device is configured such that the implant is moveable from the intermediate position to a deployed position distal of the main shaft by relative movement of the main shaft and the main handle.

A surgical method according to another exemplary aspect of the present disclosure includes, among other things, preparing a region of a bone using a tool projecting distally from a main shaft of a surgical device, and inserting an implant into the prepared region of the bone using the surgical device. The implant is inserted by moving the implant from a retracted position within the main shaft to an intermediate position within the main shaft by distal movement of an inserter relative to a main handle of the surgical device, and by further moving the implant from the intermediate position to a deployed position distal of the main shaft by relative movement of the main shaft and the main handle.

BRIEF DESCRIPTION OF THE DRAWINGS

FIG. 3 is a side view of a main shaft of the surgical device.

FIG. 4 is a cross-sectional view of the main shaft.

FIG. 5 is a side view of an alternate configuration of the tip section of the main shaft.

FIG. 6 is a side view of an example tool.

FIG. 7 is a side view of an example inserter.

FIG. 8 is a partial, cross-sectional view of the main shaft, with two inserters and one tool within the main shaft. In FIG. 8, the inserters and tool are each in a retracted position.

FIG. 9 is a side view of the surgical device with the tip section shown in cross-section, and in which a tool is in an intermediate position.

In FIG. 14, an implant and strand are shown relative to the inserter.

DETAILED DESCRIPTION

Figure 1:
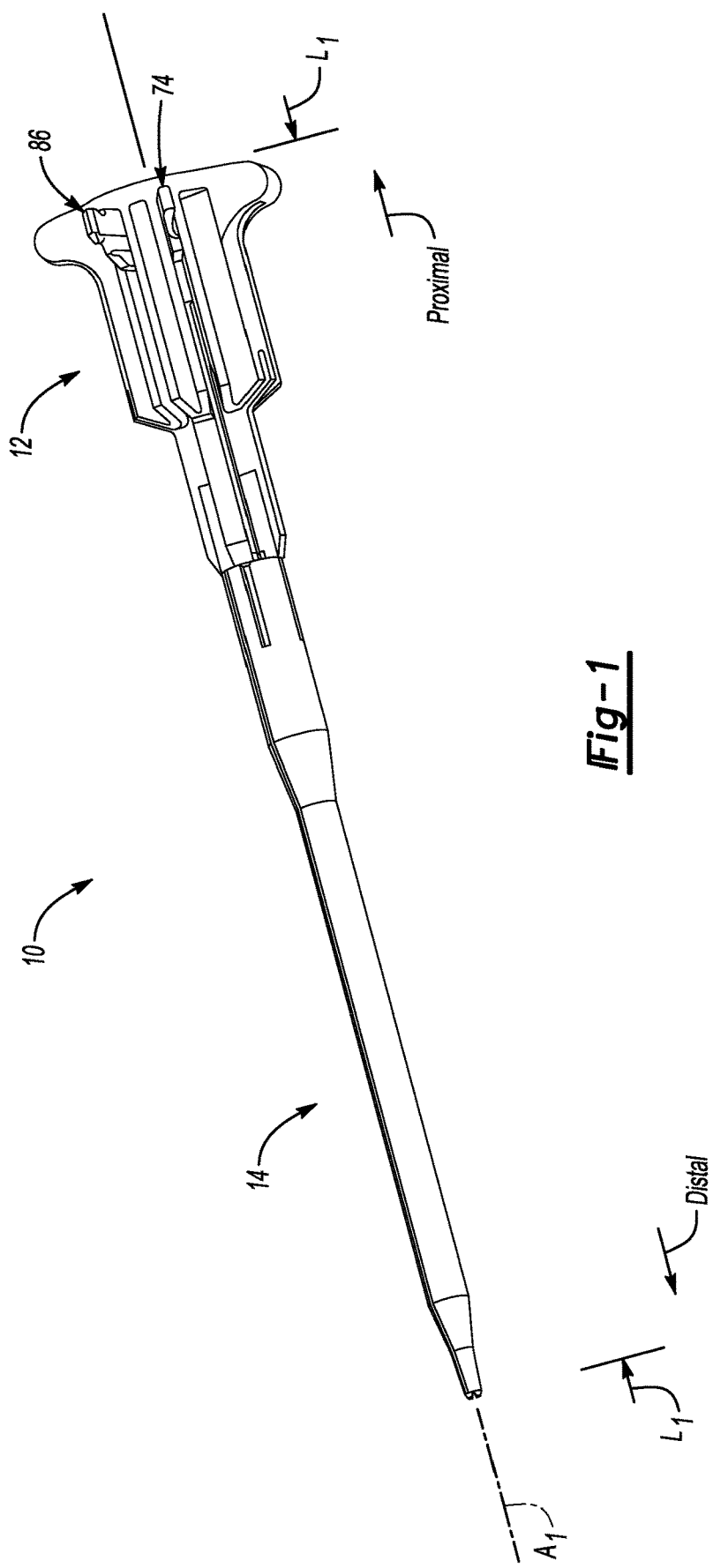
FIG. 1 is a perspective view of an example surgical device.

This disclosure details a surgical device configured to deliver multiple implants or tools, including corresponding techniques, assemblies, systems, and methods, for using the surgical device. With reference to the drawings, FIG. 1 illustrates an example surgical device 10. As shown in FIG. 1, surgical device 10 includes a handle, which is referred to as the main handle 12, and a shaft, which is referred to as the main shaft 14, projecting from the main handle 12, generally in the distal direction. The surgical device 10 exhibits an overall length $L_1$ and is arranged about central longitudinal axis $A_1$ ("axis $A_1$"). The distal and proximal directions are labeled in some of the drawings for ease of reference.

Figure 2:
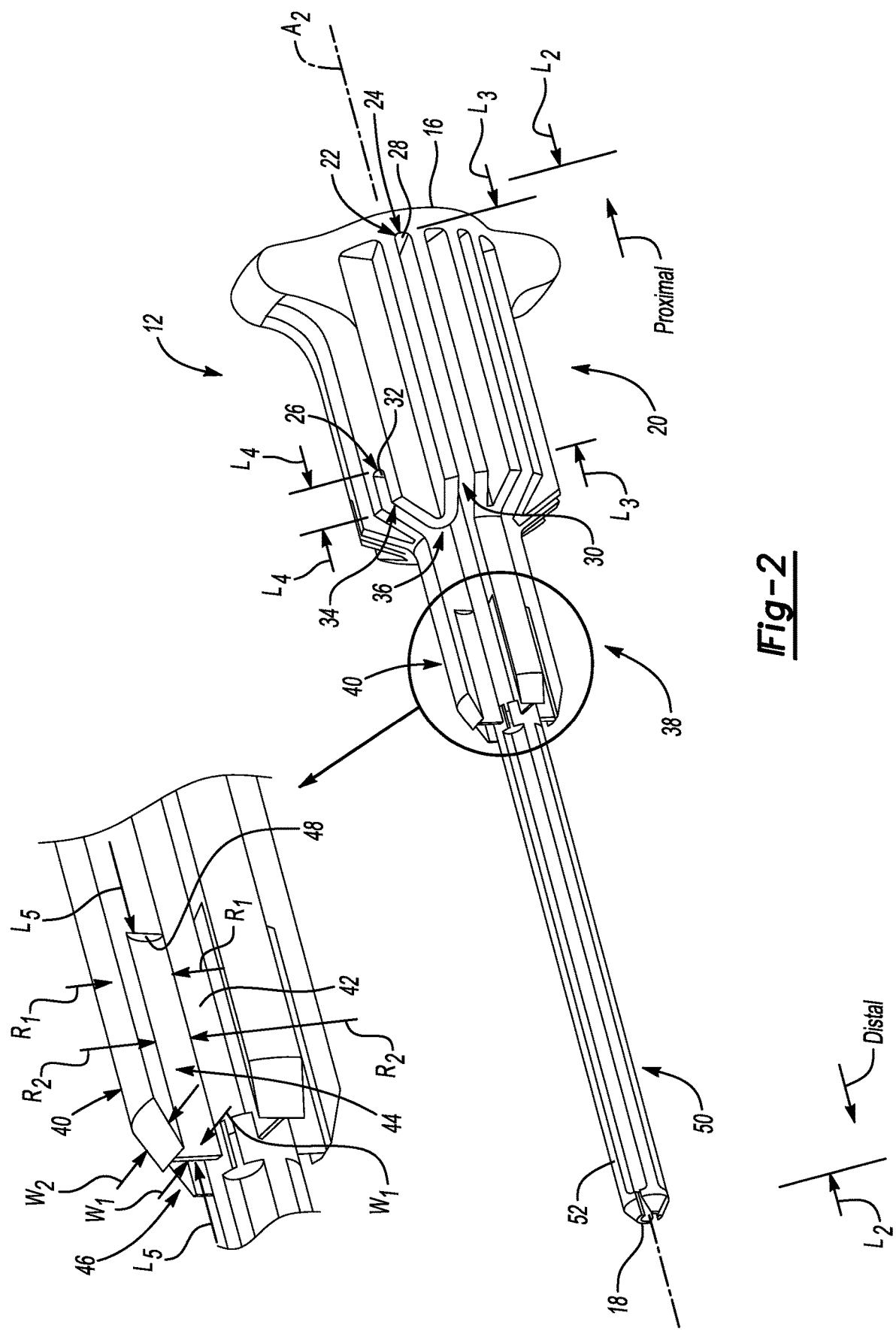
FIG. 2 is a perspective view of a main handle of the surgical device.

With reference to FIG. 2, the main handle 12 includes an overall length $L_2$ between a proximal end 16 and a distal end 18. The main handle 12 is centered about an axis $A_2$ which is coextensive with axis $A_1$ when the surgical device 10 is assembled. The proximal end 16 is substantially flat. The proximal end 16 facilitates application of loads to the main handle 12. In a particular example, a user, such as a surgeon, can apply a load to the main handle 12 by bringing a mallet into engagement with the proximal end 16.

The main handle 12 is made of a material, such as plastic, which is relatively durable and resistant to applied loads. Further, while shown as an integrally-formed structure without any joints or seams, the main handle 12 could include separately-formed structures which are attached together using known techniques.

The main handle 12 includes a first section 20 adjacent, but distal of, the proximal end 16. The first section 20 includes plurality of channels configured to receive and support portions of tools or inserters, as examples.

An example channel 22 is formed generally as a groove in an outer surface of the first section 20. The channel 22 includes a first section 24 and a second section 26 spaced-apart circumferentially (i.e., about the axis $A_2$) from the first section 24. The first section 24 extends a length $L_3$ between proximal end 28 and a distal end 30 of the first section 24. The second section 26 extends a length $L_4$ between a proximal end 32 and a distal end 34 of the second section 26. The length $L_4$ is less than the length $L_3$. The distal ends 30, 34 are aligned with one another along the axis $A_2$, while proximal end 32 is distal of proximal end 28. The channel 22 further includes a transfer section 36 distal of the first and second sections 24, 26. The transfer section 36 permits circumferential movement of a handle of an inserter or tool, as will be discussed below, between the first and second sections 24, 26.

The first and second sections 24, 26 are, in one example, configured to hold a handle of an inserter or tool in place adjacent the corresponding proximal end 28, 32. In particular, a width of the first and second sections 24, 26 gradually tapers (i.e., gradually reduces) approaching the corresponding proximal end 28, 32 such that the first and second sections 24, 26 can provide an interference-fit relative to a structure, such as a handle, within the first and second sections 24, 26. Alternatively or additionally, the first and second sections 24, 26 may include a projection, tab, or detent adjacent the corresponding proximal end 28, 32. The projection, tab, or detent, if present, would be configured to abut a structure present within the first and second sections 24, 26 to hold that structure in place adjacent the corresponding proximal end 28, 32. In either case, a user, such as a surgeon, can apply a force to the structure when the user desires to advance the structure distally within corresponding first or second section 24, 26. While tapering and projections, tabs, and detents have been described, this disclosure is not limited to such configurations.

While one example channel 22 has been described, it should be understood that the first section 20 of the main handle 12 can include more than one channel configured substantially similar to the channel 22. In a particular example, the first section 20 includes three channels configured substantially similar to channel 22. Each of the three channels are circumferentially spaced-apart from one another. In an example, two of the three channels are each configured to receive a handle of an inserter, while the other channel is configured to receive a handle of a tool. This disclosure extends to other example arrangements, however, including surgical devices with a different quantity of channels, and to surgical devices with channels configured to receive a different combination of inserters or tools. As non-limiting examples, the surgical device could include two channels, each of which receives a tool, or the surgical device could include three channels, each of which receives an inserter. This disclosure is not limited to using the surgical device with inserters or tools. Other types of devices may be used with the surgical device.

Distal of the first section 20, the main handle 12 includes a second section 38 configured to interface with the main shaft 14 in a manner that controls an insertion depth of an implant or a tool. In particular, the second section 38 includes a plurality of projections circumferentially spaced-apart from one another. With reference to one of the projections 40, the projection 40 projects radially outward from a cylindrical body 42 by a radial distance $R_1$. Adjacent the cylindrical body 42, the projection 40 includes a narrow section 44 exhibiting a circumferential width $W_1$ along a radial distance $R_2$ and along a length $L_5$ between a distal end 46 of the projection 40 and a proximal end 48 of the narrow section 44, which is spaced-apart proximally from the distal end 46. The projection 40 exhibits a width $W_2$ greater than the width $W_1$ at locations radially outward of the radial distance $R_2$. The projection 40 further exhibits a width greater than the width $W_1$ at locations proximal to the proximal end 48.

Distal of the second section 38, the main handle 12 includes a third section 50 between the second section 38 and the distal end 18. The third section 50 is configured to interface with a bore of the main shaft 14. The third section 50 may include a plurality of fingers, such as finger 52, configured to deflect radially when inserted into a bore of the main shaft 14. The third section 50 may include grooves in an outer surface thereof to facilitate sliding of inserters or tools along the surgical device 10. In an example, the third section includes at least three grooves circumferentially spaced-apart from one another to guide, permit sliding, and prevent interference between, two inserters and a tool. Grooves are not required in all examples, and when present, the third section could include a different number of grooves, such as one or more grooves. In one example, there is a fourth groove, configured to guide a drill bit, and prevent the drill be from contacting the inserters/tool.

In this example, the main handle 12 is fully cannulated along its entire length $L_2$. In particular, the main handle 12 includes a bore parallel to axis $A_2$. The bore is configured to permit a tool, such as shaft of a drill, to pass through the main handle 12. An example drill bit 112 is shown passing through the main handle 12 in FIGS. 15 and 16.

With reference to FIGS. 3 and 4, the main shaft 14 includes an overall length $L_6$ between a proximal end 54 and a distal end 56. The distal end 56 may be serrated or smooth. The main shaft 14 is centered about a central axis $A_3$ which is coextensive with axes $A_1$, $A_2$ when the surgical device 10 is assembled. The main shaft 14 is made of a metallic material, such as steel, in this example. While shown as an integrally-formed structure without any joints or seams, the main shaft 14 could be comprised of separate structures which are formed separately and attached together using techniques such as brazing or welding, as examples.

The main shaft 14 is fully cannulated along its entire length $L_6$ and includes a central bore 58 between the proximal end 54 and the distal end 56. The main shaft 14 further exhibits a slot 60 along the entire length $L_6$, which communicates between the central bore 58 and a location radially outward of the main shaft 14. The slot 60 facilitates the passing of strands, such as suture strands, between implants, which may be within the central bore 58, and a location outside the main shaft 14.

Adjacent the proximal end 54, the main shaft 14 includes a first section 62 beginning at the proximal end 54 and extending distally. Within the first section 62, the main shaft 14 exhibits a first outer diameter $D_1$. The main shaft 14 also includes a plurality of slots spaced-apart circumferentially from one another. An example slot 64 extends axially from the proximal end 54 by a length $L_7$, and radially from a radially outer surface of the first section 62 to the central bore 58. The slot 64 exhibits a width $W_3$ in the circumferential direction substantially equal to, albeit slightly larger than, width $W_1$ of the narrow sections 44 of the projections 40. The length $L_7$ is substantially equal to the length $L_5$ of the narrow sections 44. A plurality of slots configured substantially the same as slot 64 are provided about the circumference of the main shaft 14. Each of the slots 64 is configured to receive a narrow section 44 of a corresponding projection 40. While in this example the projections 40 are provided relative to the main handle 12 and the slots 64 are provided relative to the main shaft 14, the main handle 12 could include slots that receive projections of the main handle 12, in other examples.

Distal of the first section 62, the outer diameter of the main shaft 14 gradually tapers moving distally toward a second section 66, within which the main shaft 14 exhibits a second outer diameter $D_2$ less than the first outer diameter $D_1$. The second section 66 comprises a majority of the main shaft 14 by length. The second section 66 receives the third section 50 of the main handle 12. Specifically, the fingers 52 of the third section 50 abut against the inner diameter of the bore 58 within the second section 66 to facilitate a connection between the main handle 12 and the main shaft 14 that facilitates relative sliding between the main handle 12 and the main shaft 14.

Within the first and second sections 62, 66, the central bore 58 exhibits a constant inner diameter $D_3$, in this example. The inner diameter $D_3$ is selected such that multiple implants, inserters, and/or tools can fit within the central bore 58 simultaneously.

The main shaft 14 exhibits a wall thickness $T_1$, which is a radial dimension between the central bore 58 and an outer radial surface of the main shaft 14, that is thicker within the first section 62 than the wall thickness $T_2$ of the main shaft 14 in the second section 66. The wall thickness $T_1$ is substantially equal to, albeit slightly less than, the radial distance $R_2$ of the narrow sections 44. While the wall thickness of the main shaft 14 varies along its length in this example, the wall thickness could be constant along the entire length $L_6$ of the main shaft 14 in other examples.

Distal of the second section 66, the main shaft 14 includes a tip section 68, which is adjacent the distal end 56. Within the tip section 68, the inner diameter of the central bore 58 gradually reduces moving distally.

Specifically, beginning at the second section 66 and moving distally to the tip section 68, the tip section 68 includes a first tapered section 70 along length $L_8$. Within the first tapered section 70, the inner diameter of the tip section 68 gradually reduces moving distally. At a proximal end of the first tapered section 70, the inner diameter of the tip section 68 is equal to $D_3$. At a distal end of the first tapered section 70, the inner diameter of the tip section 68 is equal to $D_4$, which is less than $D_3$.

Distal of the first tapered section 70, the tip section 68 includes a second tapered section 72 along a length $L_9$. $L_9$ is greater than $L_8$ in this example. The length Ly extends proximally from the distal end 56 to the distal end of the first tapered section 70. Within the second tapered section 72, the inner diameter of the tip section 68 gradually reduces moving distally. At a proximal end of the second tapered section 72, the inner diameter of the tip section 68 is equal to $D_4$, and at the distal end 56, the inner diameter of the tip section is equal to $D_5$, which is less than $D_4$. The inner diameter of the tip section 68 reduces at a lesser rate within the second tapered section 72 relative to the first tapered section 70. In other words, the inner diameter of the tip section 68 reduces less per unit of length within the second section 72 when compared to the first section 70.

In an example of this disclosure, the tip section 68 is formed separately from a remainder of the main shaft 14. In that example, the tip section 68 may be attached to the main shaft by welding, brazing, or another known type of attachment technique. The tip section 68 could be integrally formed with the main shaft 14 in other examples.

In the example of FIGS. 3 and 4, the entire tip section 68 is centered about the axis $A_3$. In another example, the second tapered section 72 is inclined relative to its orientation in FIG. 3, and in particular is centered about an axis $A_4$, which is inclined relative to the axis $A_3$, as shown in FIG. 5. In the example of FIG. 5, the axis $A_4$ is inclined relative to the axis $A_3$ at an angle less than 90°, measured by beginning at a point on the axis $A_4$ adjacent the distal end 56, and moving toward axis $A_3$ in a generally downward direction relative to the orientation of FIG. 5.

FIG. 6 illustrates an example tool 74. The tool 74 includes a proximal end 76 and a distal end 78. Adjacent the proximal end 76, the tool 74 includes a tool handle 80 projecting laterally from a shaft 82. The tool handle 80 is configured to be grasped by a user and slid within one of the channels 22 to maneuver the tool 74. In this example, the tool 74 includes a tip section 84 adjacent the distal end 78. The tip section 84 is sharp and is configured as a punch. In general, the tool 74 may be referred to as a punch. The punch is configured to prepare a region of bone, such as by forming a bone hole, so that the prepared region of bone can receive an implant. While a punch is mentioned, other types of tools come within the scope of this disclosure.

FIG. 7 illustrates an example inserter 86. The inserter 86 includes a proximal end 88 and a distal end 90. The inserter 86 exhibits the same length as the tool 74, in this example. Adjacent the proximal end 88, the inserter 86 includes a handle 92 projecting laterally from a shaft 94. The shaft 94 extends between the handle 92 and the distal end 88. Adjacent the distal end 88, the shaft 94 is configured as a fork 96 to facilitate advancement and placement of an implant, in this example. While a fork 96 is shown, the inserter 86 does not require a fork, and could include another configuration for maneuvering an implant. The implant may be a flexible, soft anchor configured for insertion into a prepared region of bone, such as a bone hole, to facilitate attachment of soft tissue to bone. This disclosure extends to other types of implants, however.

The handle 92 is configured to be grasped by a user and slid within one of the channels 22 to maneuver the inserter 86 and, in turn, to maneuver an implant mounted adjacent the fork 96 of the inserter 86. The handle 92 also includes features configured to facilitate placement of one or more strands, such as strands of suture, relative to the handle 92. In this example, the proximal surface 98 of the handle 92 includes a groove 100, and the distal surface 102 of the handle 92 includes a groove 104 substantially laterally aligned with groove 100. Grooves 100, 104 are configured to facilitate wrapping of a strand of suture about the handle 92 while resisting sliding of the suture laterally relative to the handle 92. While two grooves 100, 104 are shown, the handle 92 could omit grooves, or could include one or more grooves. The proximal surface 98 further includes a notch 106, in this example, configured to pinch and hold the strand of suture after wrapping. The notch 106 is narrower than the grooves 100, 104 and is at least partially laterally outward of the groove 100, relative to the shaft 94. The notch 106 is not required in all examples.

An example method of using the surgical device 10 will now be described. In the example of FIG. 1, the surgical device 10 includes two inserters 86 and one tool 74. In FIG. 1, only one of the inserters 86 is visible (two inserters are visible in FIGS. 12 and 13). In the position of FIG. 1, the inserters 86 and tool 74 are each in the retracted position. In the retracted position, the handles 80, 92 of the tool 74 and inserters 86 are arranged in a first section 24 of a corresponding channel 22.

With reference to FIG. 8, in the retracted position, the distal end 78 of the tool 74 and the distal ends 90 of the inserters 86 are substantially axially aligned. The distal ends 78, 90 are spaced-proximally of the tip section 68 in the retracted position, in this example. The retracted position of the tool 74 and the inserters 86 may be referred to as a ready position in which the tool 74 and inserters 86 are ready for a user to choose to deploy them.

Implants are not shown in FIG. 8 for ease of reference. That said, each inserter 86 can support a corresponding an implant adjacent its distal end 90. When an inserter 86 supports an implant, advancement of an inserter 86 results in corresponding advancement of the associated implant.

Figure 10:
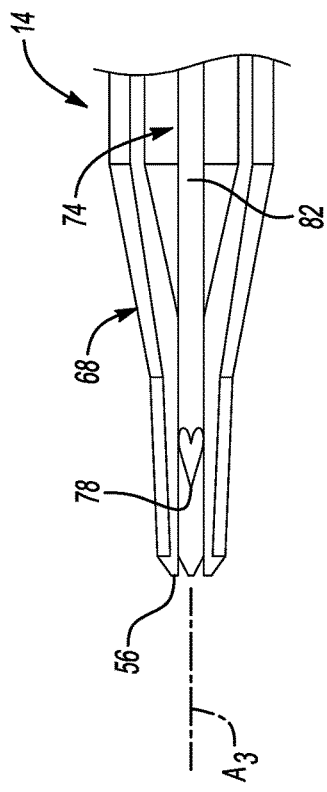
FIG. 10 is a close-up view of the encircled area in FIG. 9.

In FIG. 9, a user has moved the tool 74 from the retracted position to an intermediate position. In particular, the user has grasped the handle 80 and first advanced it distally along first section 24 of channel 22, which may be referred to as a tool channel because it guides movement of the tool 74, following path $P_1$. With the handle 80 distal of the first section 24, the user moves the handle 80 circumferentially, through transfer section 36, and into second section 26. In FIG. 9, a proximal surface 98 of the handle 80 abuts the proximal end 32 of the second section 26. When in the intermediate position, the distal end 78 of the tool 74 advances into the tip section 68, as shown in FIG. 10, but does not project distally out of the distal end 56. As shown in FIG. 10, the taper of the tip section 68 is such that the shaft 82 of the tool 74 is substantially co-axial with the axis $A_3$ of the main shaft 14 when the shaft 82 is in the intermediate position.

In the retracted and intermediate positions, the main shaft 14 is distal of the projections 40 of the main handle 12. Specifically, the projections 40 are not received in the slots 64, as generally shown in FIG. 9.

Figure 11:
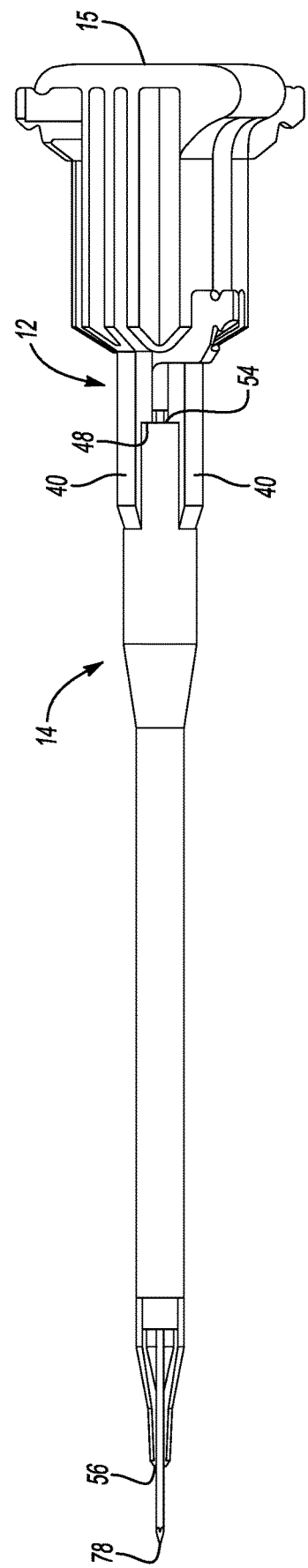
FIG. 11 is a side view of the surgical device with the tip section shown in cross-section, and in which a tool is in a deployed position.

With the tool 74 in the intermediate position, the distal end 56 is positioned relative to a bone. In this example, the distal end 56 is placed over an area of bone where a bone hole is desired to be formed. When placed in a desired location, the tool 74 can be advanced into the deployed position of FIG. 11 by relative movement of the main handle 12 and the main shaft 14. In FIG. 11, the narrow sections 44 of the projections 40 are received in a corresponding one of the slots 64. Further, in FIG. 11, the proximal end 54 of the main shaft 14 abuts a proximal end 48 of the narrow sections 44. In this position, which is the deployed position, the distal end 78 of the tool 74 is deployed and projects distally of the distal end 56 of the main shaft 14. The distance by which the distal end 78 projects distally of the distal end 56 is governed by, and substantially equals, the lengths $L_5$, $L_7$ of the narrow section 44 and the slots 64.

The relative movement of the main shaft 14 and the main handle 12 between the intermediate and deployed positions may be brought about by holding the main shaft 14 in place against a bone surface while applying a load to the proximal end 16 of the main handle 12, such as by using a mallet. In this example, moving the tool 74 from the intermediate to the deployed position is brought about by distal movement of the main handle 12 relative to the main shaft 14. Further, in this example, when moving from the intermediate to the deployed position, there is no relative movement between the tool 74 and the main handle 12.

Following formation of the bone hole, a user may move the tool 74 back to the retracted position by relative movement of the main handle 12 and main shaft 14, such that the projections 40 are not received in the slots 64, and by moving the handle 80 back into the first section 24 of channel 22 by reversing the path $P_1$.

Figure 12:
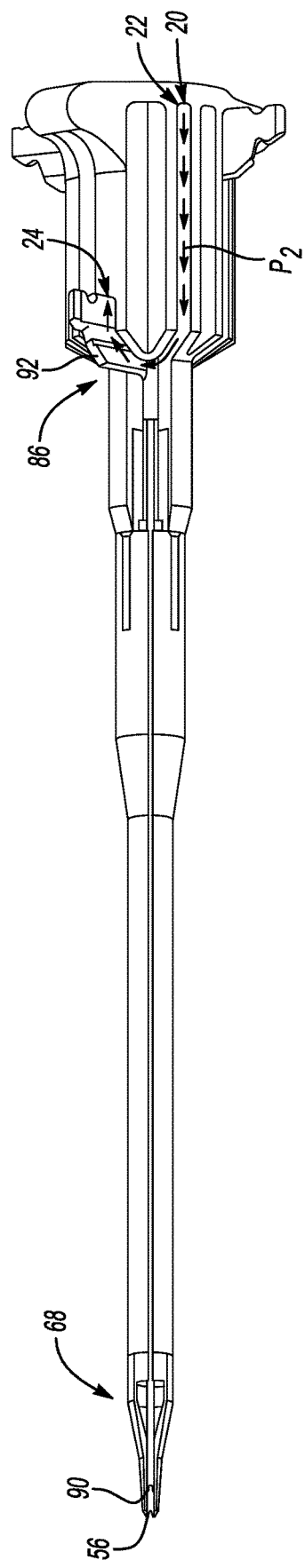
FIG. 12 is a side view of the surgical device with the tip section shown in cross-section, and in which an inserter is in an intermediate position.

With a bone hole formed using the tool 74, and the tool 74 moved back to the retracted position, a user may then select to deploy an implant supported adjacent a distal end of one of the inserters 86 into the bone hole. FIG. 12 represents a movement of one of the inserters 86 from the retracted position of FIG. 1 to an intermediate position. To make this movement, a user first grasps a handle 92 of an inserter 86 and moves the handle 92 distally along the first section 24 of a corresponding channel 22 and into a second section 26, following path $P_2$, similar to the above-described process corresponding to the tool 74. The proximal surface 98 contacts a proximal end 32 of the second section 26, in this example, when the inserter 86 is in the intermediate position. In the intermediate position, as with the tool 74, the distal end 90 of the inserter 86, and any implant mounted thereto, is within the tip section 68 but does not project out of the distal end 56.

With the inserter 86 in the intermediate position, the inserter 86 and the implant corresponding to the inserter 86 can be deployed by moving the inserter 86 to a deployed position by relative movement of the main shaft 14 and main handle 12. In a particular example, movement from the intermediate position to the deployed position is brought about by distal movement of the main handle 12 relative to the main shaft 14, which is held substantially in place adjacent a bone hole for example, and without relative movement between the inserter 86 and the main handle 12.

Figure 13:
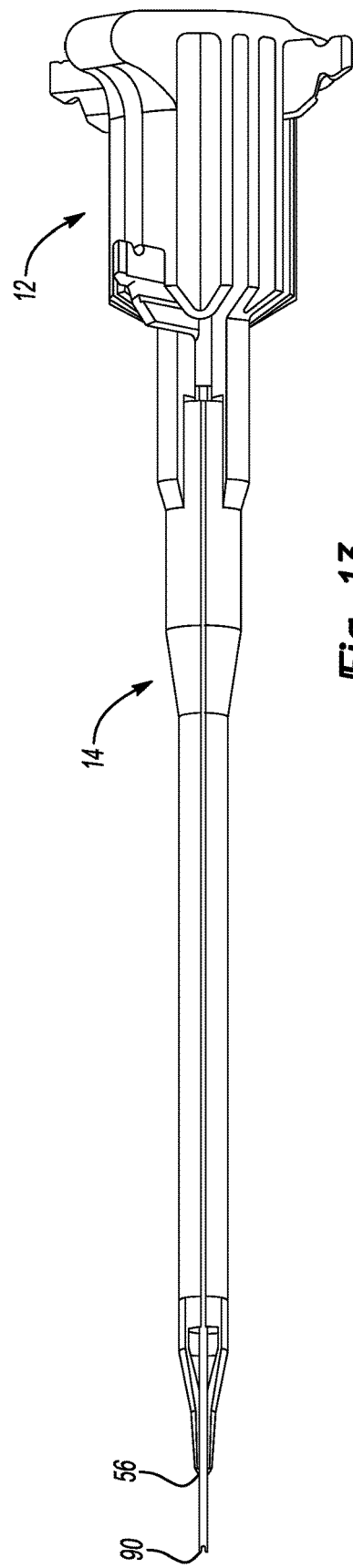
FIG. 13 is a side view of the surgical device with the tip section shown in cross-section, and in which an inserter is in a deployed position.

In FIG. 13, the inserter 86 is in the deployed position. In FIG. 13, the main shaft 14 and main handle 12 are arranged substantially the same as in FIG. 11, with the slots 64 receiving the narrow sections 44 of the projections 40.

Figure 14:
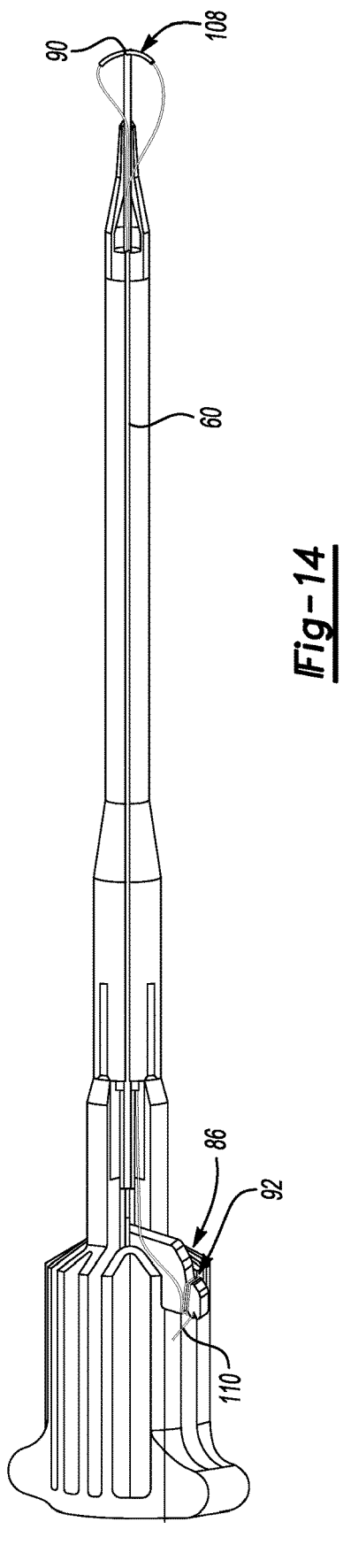
FIG. 14 is a side view of the surgical device in which an inserter is in a deployed position.

FIG. 14 illustrates the inserter 86 in the deployed position, and further illustrates an implant 108 supported on the distal end 90 of the inserter 86. The implant 108 is connected to a strand 110 which passes through the central bore 58 and is wrapped relative to handle 92. To separate the implant 108, the user unwraps it from the handle 92 and uses the slot 60 to remove the strand 110 from the central bore 58. The user can use the implant 108 and strand 110 to attach soft tissue to bone.

With the implant 108 separated from the inserter 86, the user can move the inserter 86 back to the retracted position, prepare another bone hole using tool 74, and use the other inserter 86, which is still loaded with an implant, to deploy another implant into the additional bone hole.

In the disclosed example, the tool 74 and inserters 86 are each moveable independent of one another. Further, the implants associated with the different inserters 86 of the surgical device 10 are moveable independent of one another. The strands affixed to the various implants loaded into the surgical device are not connected together, in this example. As such, the user can deploy multiple independent implants using a single surgical device 10, and the user is able to maneuver the strands associated with those implants independently.

The implant 108 of FIG. 14 is a soft anchor made of a suture material, substantially similar to or identical to the FiberTak® implant offered commercially by Arthrex, Inc. The implant 108 could be a hard implant, such as substantially similar to or identical to the implants of the Push-Lock® or the SwiveLock® devices offered commercially by Arthrex, Inc. In these hard-implant examples, the shaft 94 could be cannulated and the strand 110 could pass through that cannulation, and ultimately out the proximal end 16 of the main handle 12.

Figure 15:
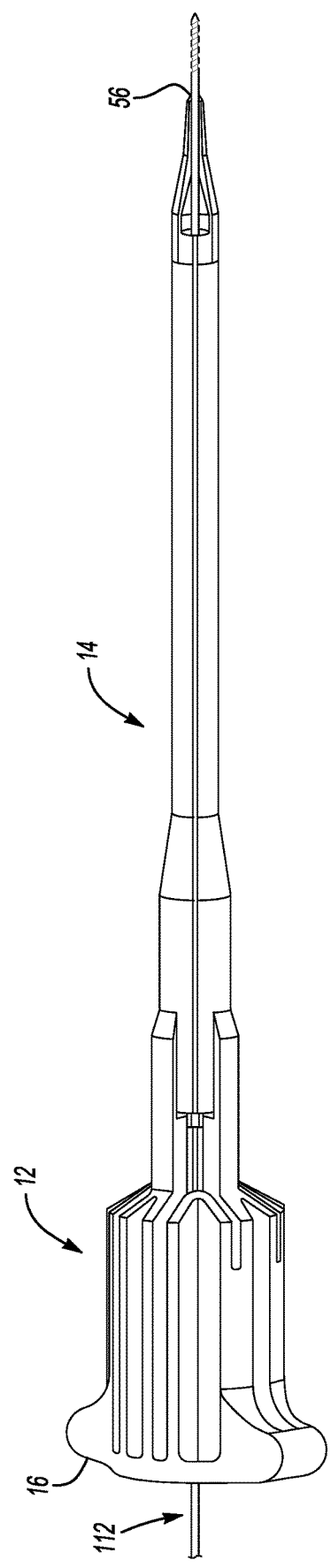
FIG. 15 is a side view of the surgical device, and specifically illustrates a drill passing through the surgical device.
Figure 16:
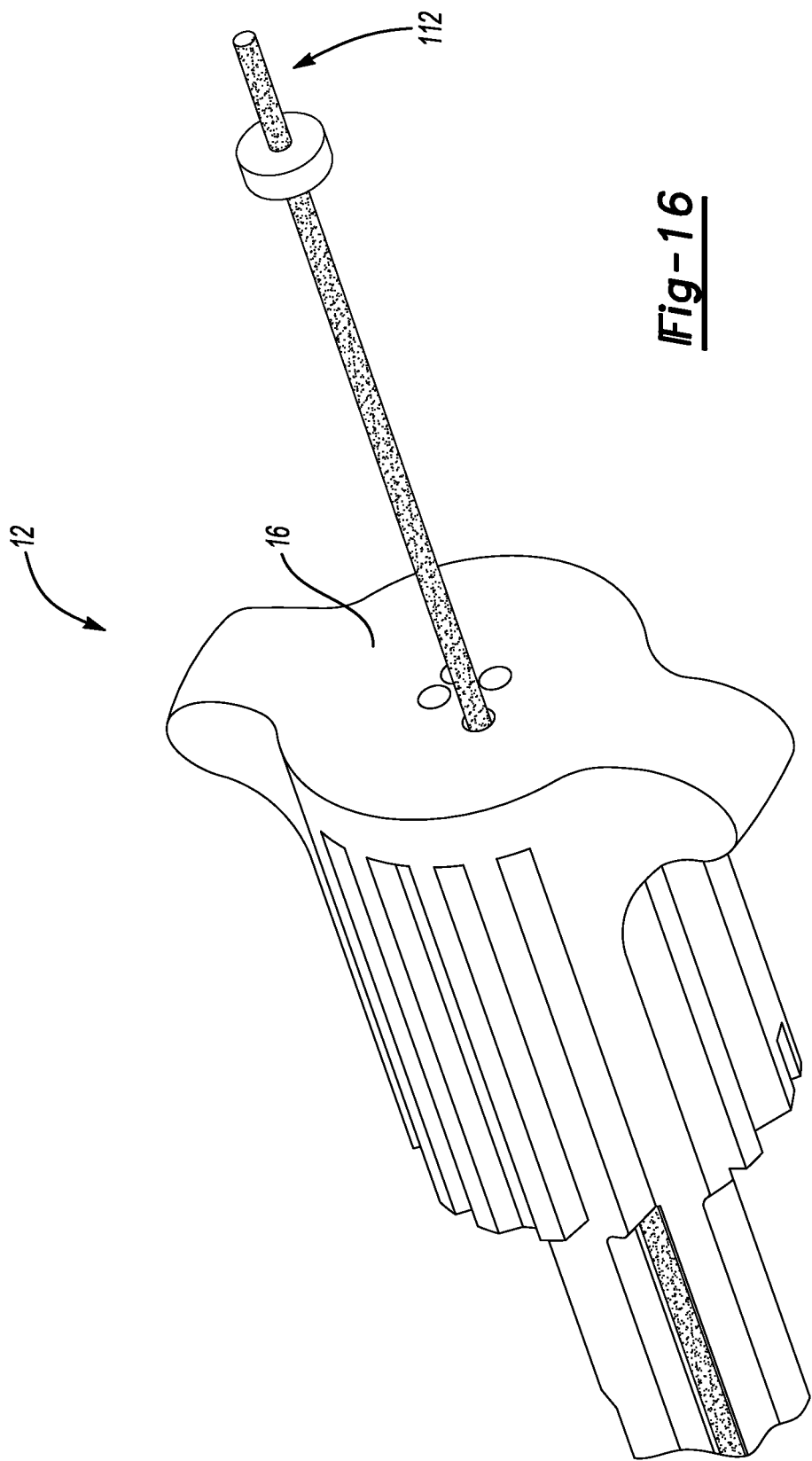
FIG. 16 is a perspective view of a portion of the surgical device from a proximal perspective, and in particular illustrates a drill bit passing through a cannulation of the main handle.

As an additional or alternative feature, the surgical device 10 could be fully cannulated along its length such that a tool, such as a drill bit, could pass through an entire length of the surgical device 10. With reference to FIGS. 15 and 16, a drill bit 112 passes through the entire length of the surgical device 10, such that the drill bit 112 projects distal of the distal end 56 and a portion of the drill bit 112 is accessible proximally of the proximal end 16 for attachment to a drill. The surgical device 10 is configured such that passing the drill bit 112 through the cannulation of the surgical device 10 does not interfere with the tool 74, the inserters 86, or their corresponding implants, which may be present within the surgical device 10 when the drill bit 112 is used.

In this disclosure, a soft anchor refers to a construct formed of soft materials such as yarns, fibers, filaments, strings, fibrils, strands, sutures, etc., or any combination of such materials. The soft materials may be synthetic or natural materials, or combinations of synthetic and natural materials, and may be bio-degradable or non-degradable within the scope of this disclosure. In one non-limiting example, the soft anchor is made exclusively of soft, suture-based materials.

In an example, the implant 108 is a soft anchor which includes a sheath, which is a tubular sleeve made of a flexible material, such as a braided, woven, or knitted structure made of yarns, fibers, filaments, sutures or similar materials, or combinations of these materials. In one example, the sheath is constructed of polyester suture material. Other materials may also be suitable to construct the sheath. The strand 110 may pass through at least a portion of a bore of the sheath, and may assist in bunching the sheath once the implant 108 is within a bone hole.

In one example, the strand 110 is a suture. Non-limiting examples of suitable sutures include FiberWire®, TigerWire®, or FiberChain® suture, all offered commercially by Arthrex, Inc., although any type of suture may be utilized, including cored or coreless sutures. In another example, the flexible strand is suture tape, such as FiberTape®, which is offered commercially by Arthrex, Inc. The strand 110 could include any soft, flexible strand of material.

When the implant 108 is a hard implant, it may be formed of a bioabsorbable material such as PLLA (poly-L-lactide acid or poly-L-lactic acid. The hard implant may be a hard implant assembly including two or more hard structures.

The surgical device 10 can be used in rotator cuff repairs/reconstructions, as well as in other repair or reconstruction techniques, including techniques involving repair or reconstruction of the hand, wrist, toe, Achilles tendon, Peroneal/Tibial tendon, among others.

It should be understood that directional terms such as distal, proximal, radial, axial, circumferential, etc., are used herein consistent with their art-accepted meanings and with reference to the normal operational orientation of the surgical device. These terms should not otherwise be considered limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A surgical device, comprising:
a main handle;
a main shaft;
an inserter partially within the main shaft; and
an implant adjacent a distal end of the inserter, wherein the surgical device is configured such that the implant is moveable from a retracted position within the main shaft to an intermediate position within the main shaft by distal movement of the inserter relative to the main handle, and wherein the surgical device is configured such that the implant is moveable from the intermediate position to a deployed position distal of the main shaft by relative movement of the main shaft and the main handle.

2. The surgical device as recited in claim 1, wherein:
the main handle includes a channel,
the channel includes a first section and a second section,
the first section exhibits a greater length than the second section,
the first and second sections are circumferentially spaced-apart from one another,
the inserter includes a handle,
the surgical device is configured such that when the implant is in the retracted position, the handle of the inserter is within the first section, and
the surgical device is configured such that when the implant is in the intermediate position, the handle of the inserter is within the second section.

3. The surgical device as recited in claim 2, wherein, the surgical device is configured such that when the implant is in the deployed position, the handle of the inserter is within the second section.

4. The surgical device as recited in claim 2, wherein, adjacent a distal end of the first section and a distal end of the second section, the channel includes a transfer section configured to permit circumferential movement of the handle between the first and second sections.

5. The surgical device as recited in claim 1, wherein:
the main handle includes one of slots or projections,
the main shaft includes the other of slots or projections, and
the surgical device is configured such that when the implant is in the deployed position, each of the projections is at least partially within a corresponding one of the slots.

6. The surgical device as recited in claim 5, wherein:
the surgical device is configured such that when the implant is in the retracted and intermediate positions, the projections are not received in a corresponding one of the slots.

7. The surgical device as recited in claim 1, wherein:
the main shaft includes a tip section adjacent a distal end of the main shaft, and
the tip section includes a first tapered section in which an inner diameter of a bore of the main shaft gradually reduces distally.

8. The surgical device as recited in claim 6, wherein:
the tip section includes a second tapered section in which the inner diameter of the bore of the main shaft gradually reduces distally,
the second tapered section is distal of the first tapered section, and
the inner diameter of the bore reduces at a lesser rate within the second tapered section than within the first tapered section.

9. The surgical device as recited in claim 8, wherein the second tapered section is centered about an axis inclined relative to an axis about which the first tapered section is centered.

10. The surgical device as recited in claim 1, wherein:
the inserter includes a handle projecting radially outward of the main handle,
the handle of the inserter includes a groove,
the implant is attached to a flexible strand, and the surgical device is configured such that the groove facilitates wrapping of the flexible strand relative to the handle.

11. The surgical device as recited in claim 10, wherein the surgical device is configured such that the flexible strand is configured to be unwrapped and separated from the handle when the implant is in the deployed position.

12. The surgical device as recited in claim 10, wherein:
the main shaft includes a slot along an entirety of a length thereof, and
the slot is configured to permit the flexible strand to pass from within a bore of the main shaft to a location outside the main shaft.

13. The surgical device as recited in claim 1, wherein the inserter is a first inserter and the implant is a first implant, and wherein the surgical device further comprises:
a second inserter partially within the main shaft, wherein the second inserter is moveable independent of the first inserter; and
a second implant adjacent a distal end of the second inserter, wherein the surgical device is configured such that the second implant is moveable from a retracted position within the main shaft to an intermediate position within the main shaft by distal movement of the second inserter relative to the main handle, and wherein the surgical device is configured such that the implant is moveable from the intermediate position to a deployed position distal of the main shaft by relative movement of the main shaft and the main handle.

14. The surgical device as recited in claim 13, wherein:
the main handle includes a first channel and a second channel circumferentially spaced-apart from one another,
the first and second channels each include a first section and a second section, the first sections of each of the first and second channels exhibit a greater length than the corresponding second sections,
the first sections of each of the first and second channels are circumferentially spaced-apart from the corresponding second sections,
the first inserter includes a first handle,
the second inserter includes a second handle,
the surgical device is configured such that when the first implant is in the retracted position, the first handle is within the first section of the first channel, the surgical device is configured such that when the first implant is in the intermediate and deployed positions, the first handle is within the second section of the first channel,
the surgical device is configured such that when the second implant is in the retracted position, the second handle is within the first section of the second channel, and
the surgical device is configured such that when the second implant is in the intermediate and deployed positions, the second handle is within the second section of the second channel.

15. The surgical device as recited in claim 1, further comprising:
a tool including a tool handle, a shaft, and a tip section adjacent a distal end of the tool, wherein the surgical device is configured such that the tip section is moveable from a retracted position within the main shaft to an intermediate position within the main shaft by distal movement of the tool handle relative to the main handle, and wherein the surgical device is configured such that the tip section is moveable from the intermediate position to a deployed position distal of the main shaft by relative movement of the main shaft and the main handle.

16. The surgical device as recited in claim 15, wherein the tip section is configured as a punch.

17. The surgical device as recited in claim 15, wherein:
the main handle includes a tool channel,
the tool channel includes a first section and a second section,
the first section exhibits a greater length than the second section,
the first and second sections are circumferentially spaced-apart from one another, the surgical device is configured such that when the tip section is in the retracted position, the tool handle is within the first section, and
the surgical device is configured such that when the implant is in the intermediate and deployed positions, the tool handle is within the second section.

18. The surgical device as recited in claim 1, wherein the main handle includes a bore in communication with a bore of the main shaft, and wherein the bore of the main handle and the bore of the main shaft are configured such that a tool is able to pass through the bore of the main handle and the bore of the main shaft while the implant is in the retracted position.

19. The surgical device as recited in claim 18, wherein the tool is a drill bit.

20. A surgical method, comprising:
preparing a region of a bone using a tool projecting distally from a main shaft of a surgical device; and
inserting an implant into the prepared region of the bone using the surgical device, wherein the implant is inserted by moving the implant from a retracted position within the main shaft to an intermediate position within the main shaft by distal movement of an inserter relative to a main handle of the surgical device, and by further moving the implant from the intermediate position to a deployed position distal of the main shaft by relative movement of the main shaft and the main handle.

* * * * *